(12) United States Patent
Spoors

(10) Patent No.: US 7,267,223 B2
(45) Date of Patent: Sep. 11, 2007

(54) BELT CONVEYOR WITH A SUPPORTING PLATFORM FORMED FROM A SINGLE SHEET OF METAL

(75) Inventor: Simon Spoors, Stockton on Tees (GB)

(73) Assignee: Innoveytion Limited, Jarrow, Tye & Wear (GB)

( * ) Notice: Subject to any disclaimer, the term of this patent is extended or adjusted under 35 U.S.C. 154(b) by 0 days.

(21) Appl. No.: 10/532,859

(22) PCT Filed: Oct. 24, 2003

(86) PCT No.: PCT/GB03/04572

§ 371 (c)(1),
(2), (4) Date: Apr. 26, 2005

(87) PCT Pub. No.: WO2004/037690

PCT Pub. Date: May 6, 2004

(65) Prior Publication Data
US 2006/0054473 A1   Mar. 16, 2006

(30) Foreign Application Priority Data
Oct. 26, 2002 (GB) .................................. 0224999.3

(51) Int. Cl.
*B65G 21/00* (2006.01)
(52) U.S. Cl. ................ 198/860.1; 198/816; 198/836.1; 198/844.1; 198/860.3; 198/841; 198/861.1
(58) Field of Classification Search ................ 198/816, 198/836.1, 844.1, 860.3, 841, 861.1, 860.1
See application file for complete search history.

(56) References Cited

U.S. PATENT DOCUMENTS

| | | | | |
|---|---|---|---|---|
| 1,508,898 A | * | 9/1924 | Smith | 108/57.3 |
| 2,523,829 A | * | 9/1950 | Hubbell | 198/346 |
| 3,458,235 A | * | 7/1969 | Johannes et al. | 299/34.1 |
| 4,013,167 A | * | 3/1977 | Bourgeois | 198/860.2 |
| 4,475,648 A | * | 10/1984 | Weeks | 198/830 |
| 4,704,772 A | * | 11/1987 | Kasai | 24/669 |
| 4,775,047 A | * | 10/1988 | Grall | 198/861.2 |
| 5,601,180 A | * | 2/1997 | Steeber et al. | 198/502.1 |
| 6,109,427 A | * | 8/2000 | Hosch et al. | 198/835 |
| 6,170,645 B1 | * | 1/2001 | Mitchell | 198/816 |
| 6,269,939 B1 | * | 8/2001 | Lapeyre et al. | 198/615 |
| 6,478,143 B1 | * | 11/2002 | Enomoto | 198/838 |
| 6,814,215 B2 | * | 11/2004 | Krampl | 198/321 |

FOREIGN PATENT DOCUMENTS

FR          2663309 A1 * 12/1991

* cited by examiner

Primary Examiner—Gene O. Crawford
Assistant Examiner—Leslie A Nicholson, III
(74) Attorney, Agent, or Firm—Gottlieb, Rackman & Reisman, P.C.

(57) ABSTRACT

A conveyor, primarily but not exclusively for use in the food industry, in which a conveyor belt (19) is supported on a belt platform (11) for movement relative thereto, and the belt platform (11) is formed as a unitary component from a single sheet metal blank. Preferably the conveyor includes a support leg structure (12, 13) and that supporting leg structure is also formed as a unitary component from a single metal blank. Most preferably the belt platform and the supporting leg structure are formed as a unitary component from a single metal blank.

3 Claims, 11 Drawing Sheets

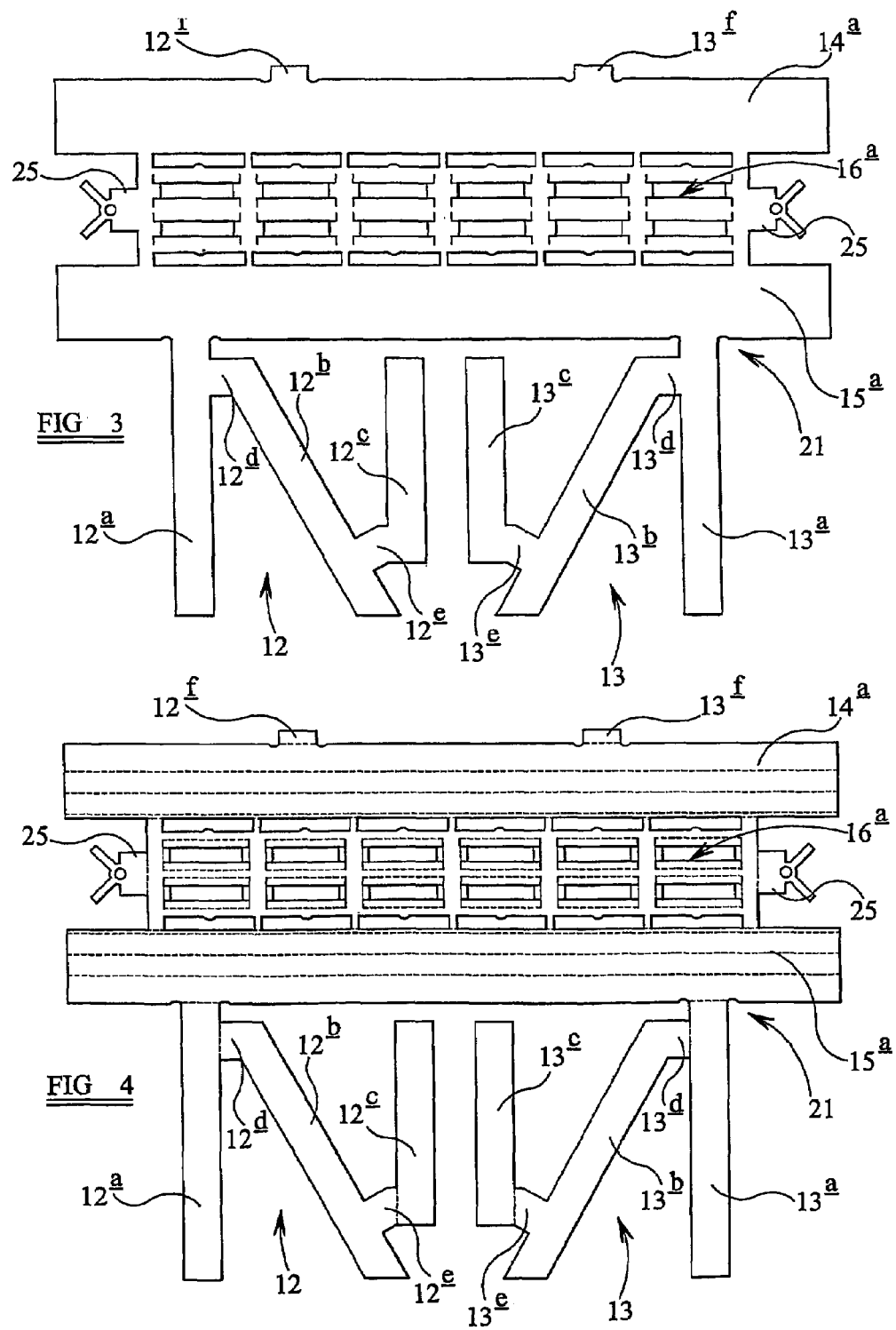

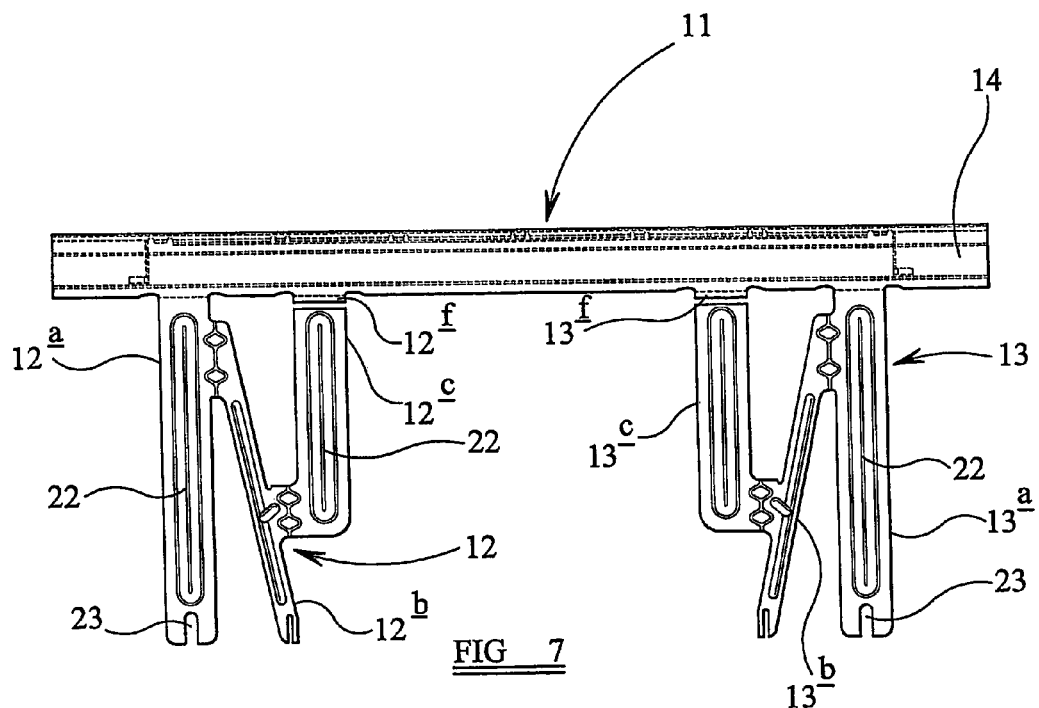
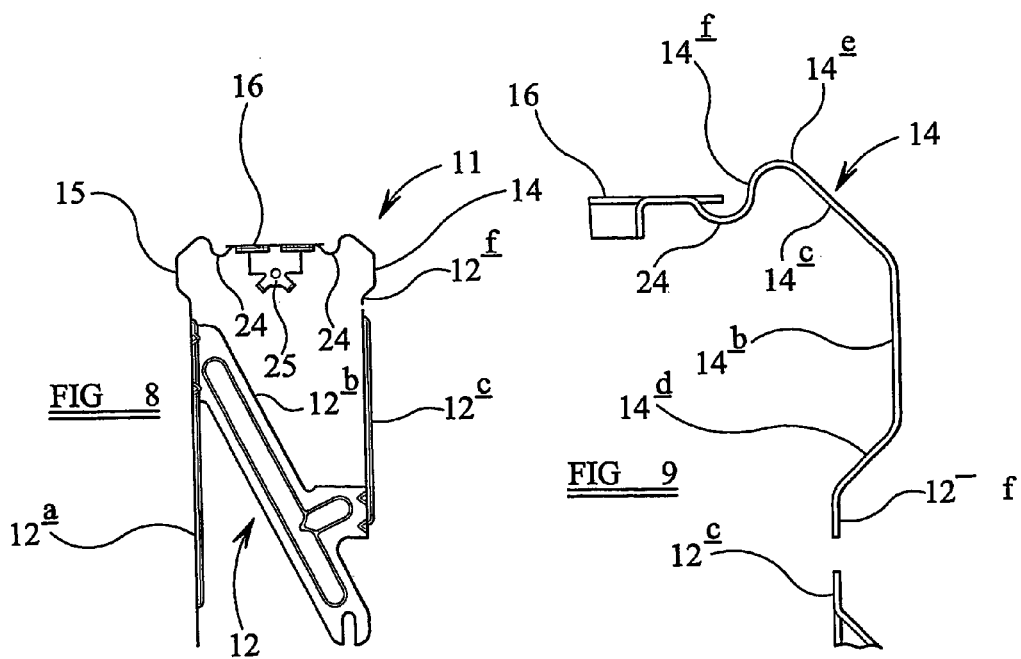

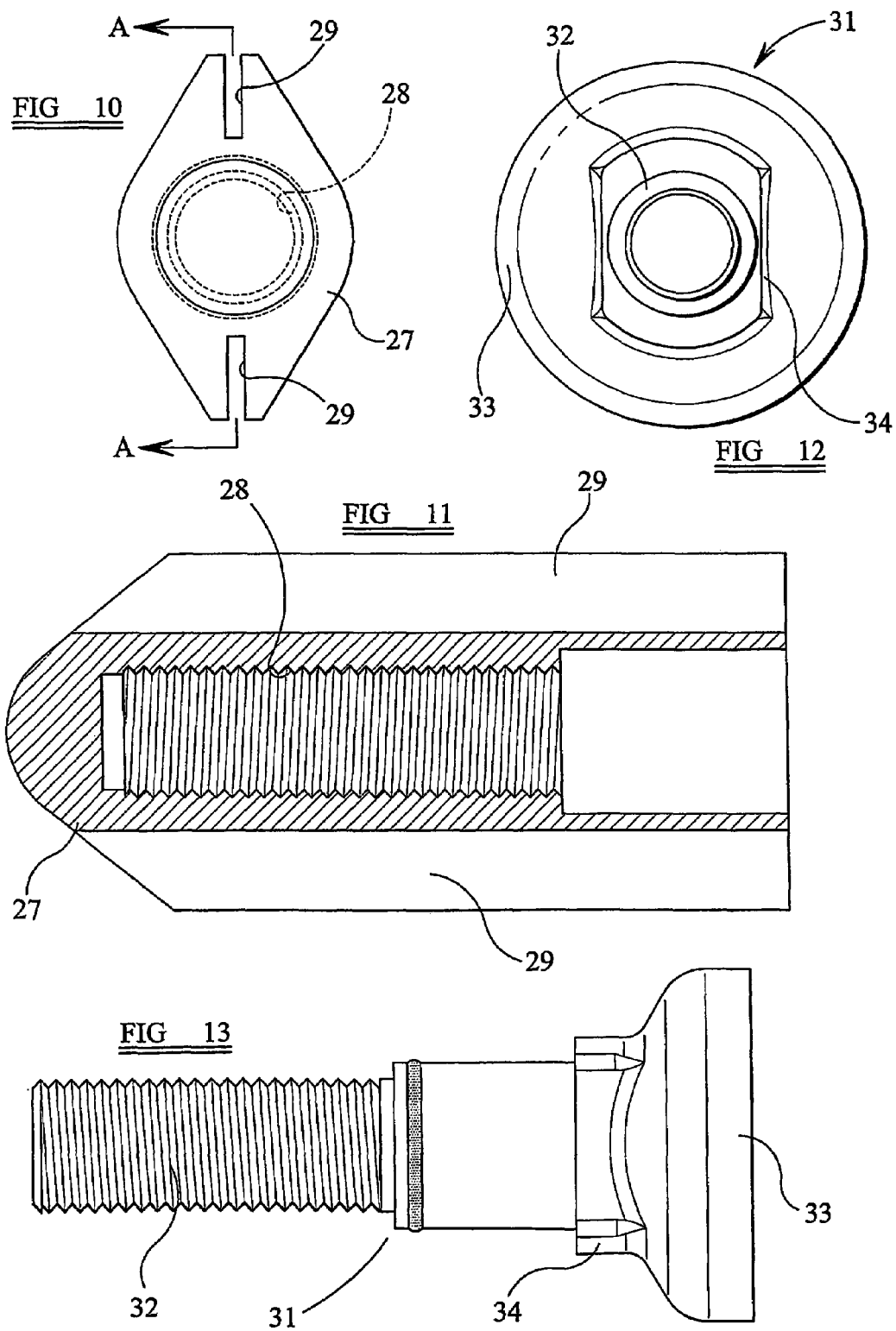

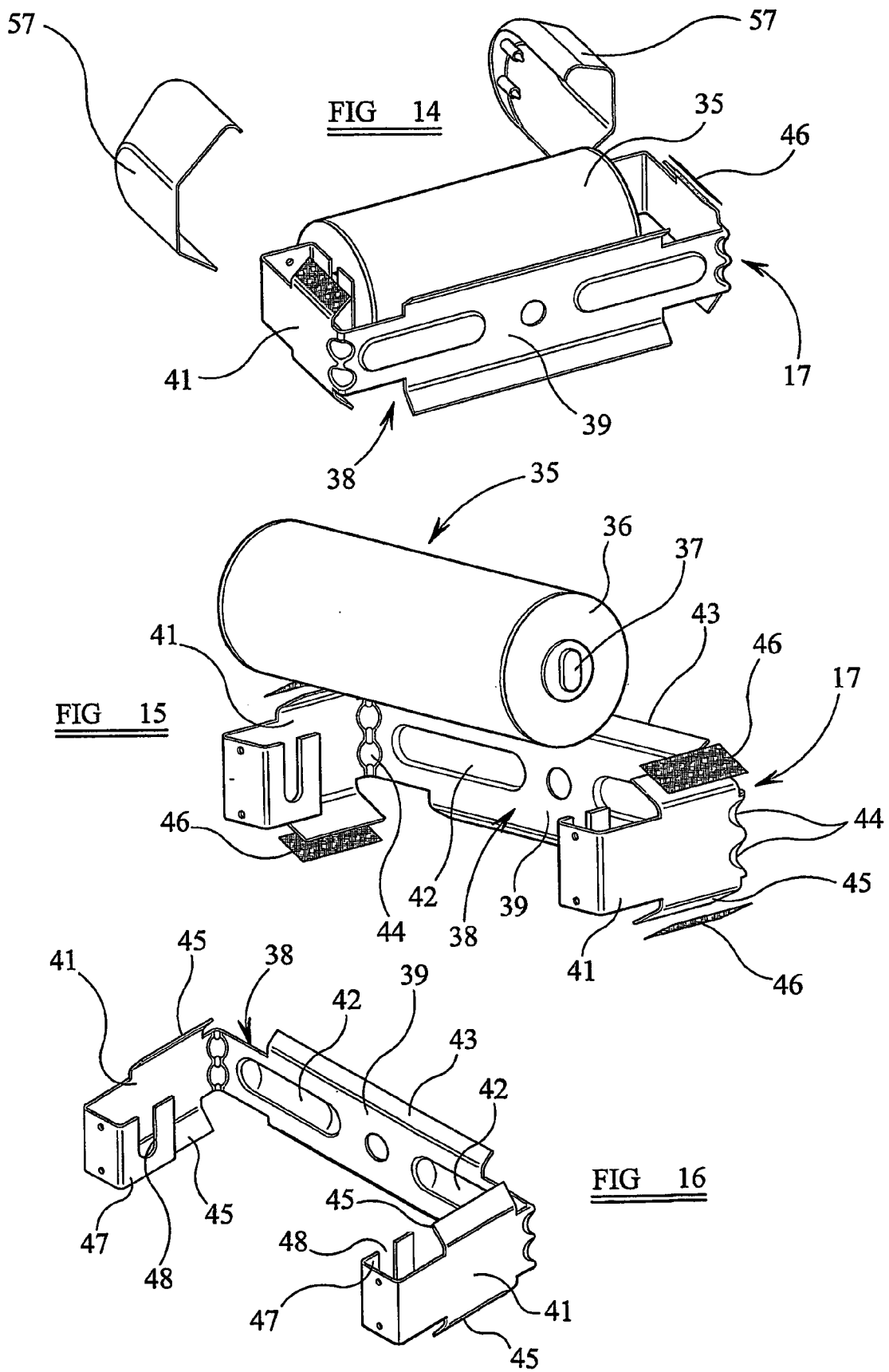

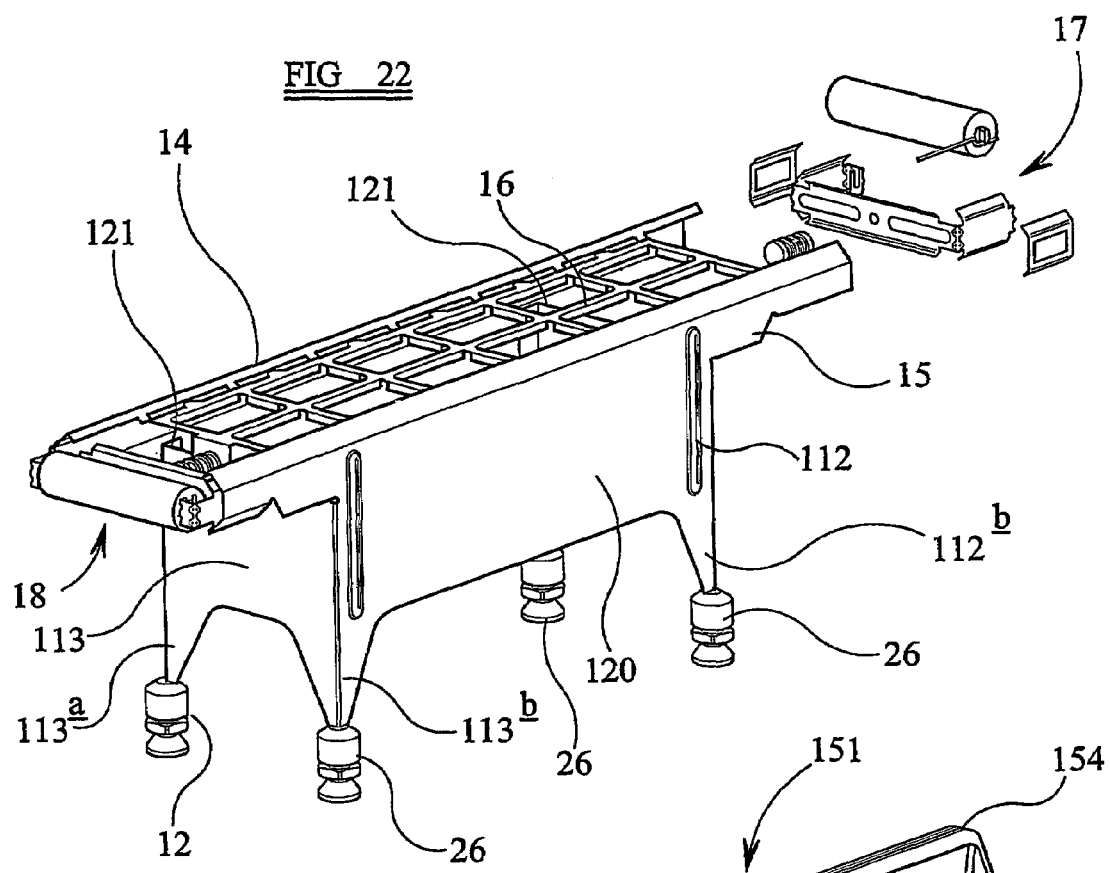
FIG 22
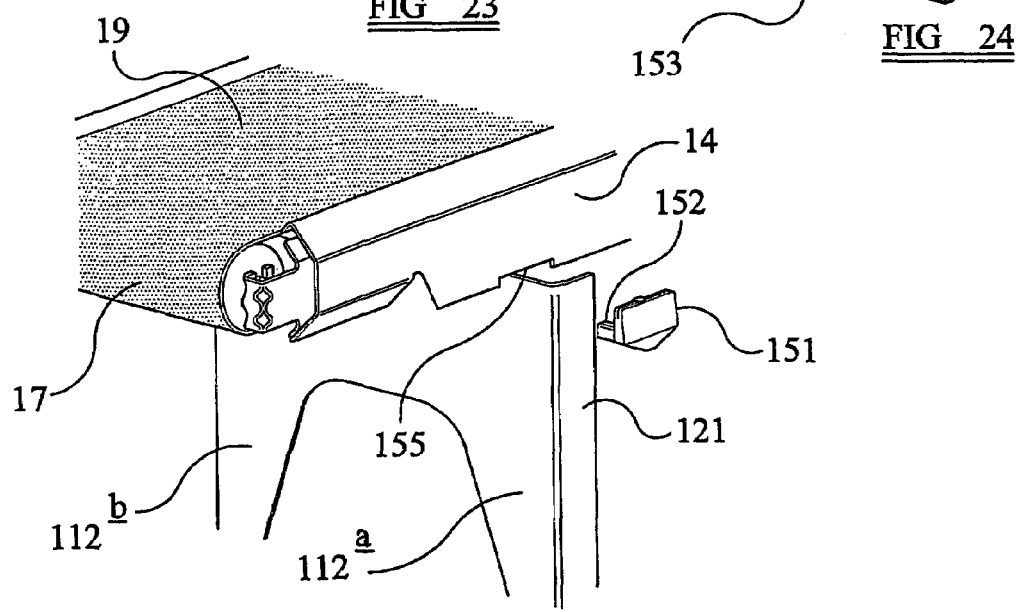
FIG 23
FIG 24

BELT CONVEYOR WITH A SUPPORTING PLATFORM FORMED FROM A SINGLE SHEET OF METAL

TECHNICAL FIELD

This invention relates to belt conveyors primarily but not exclusively for use in the food industry.

BACKGROUND ART

Conventionally a belt conveyor comprises an elongate belt arranged as an endless loop supported at its ends by opposite roller assemblies, one of which may be driven. The belt defines upper and lower runs and is carried by a generally rigid supporting frame. The supporting frame consists generally of an elongate belt platform carrying the roller assemblies supporting the belt and a platform support structure usually in the form of a leg assembly supporting the belt platform in an elevated position relative to floor level.

In a conventional conveyor the frame of the conveyor is fabricated from a large plurality of separately formed components, by bolting or welding the components together. In many conveyor applications a fabricated frame is undesirable as the points of interconnection of components tend to become sites of corrosion in use. Moreover, in applications such as food processing, a conveyor frame fabricated from a plurality of individual components presents serious hygiene problems. The crevices defined where components are bolted together act as traps retaining food materials spilled from the conveyor (food spoil) and thus constitute sites for bacterial growth. By their nature such crevices are extremely difficult to clean and thus the cleanliness, and freedom from bacterial contamination, which is a prerequisite of the food industry, is difficult to maintain.

The use of welding, rather than bolted joints between components of the frame eliminates some of the crevices, but does not eliminate the hygiene problem. It is found that welding together of the components, particularly where the components are formed from stainless steel, causes changes in the internal structure of the metal in the region of the weld which allows bacteria to penetrate the material at the grain boundaries of the material adjacent the weld resulting in bacterial colonisation of the material, leading to corrosion and the formation of crevices which can trap food spoil leading to further bacterial growth.

In consequence existing conveyors need to be cleaned frequently, using steam cleaning apparatus, caustic solvents, and significant amounts of manual labour, in order to preserve the hygiene standards necessary in the food industry.

It is an object of the present invention to provide a conveyor, suitable for use in the food industry, which facilitates the maintenance of the necessary hygiene standards with a lower frequency, or less intense, cleaning regime than is currently necessary.

DISCLOSURE OF INVENTION

In accordance with a first aspect of the present invention there is provided a conveyor in which substantially the whole of the belt platform of the conveyor is formed as a unitary component from a single sheet of metal.

In accordance with a second aspect of the present invention there is provided a conveyor in which substantially the whole of the frame of the conveyor, including the belt platform and the platform support arrangement is a unitary component formed from a single sheet of metal.

Preferably the conveyor comprises an elongate belt platform with integral leg structures dependant therefrom adjacent opposite ends of the platform.

Preferably the design of the supporting frame of the conveyor is such that the frame is substantially free of surfaces which are horizontal in use.

It will be recognised that the avoidance of horizontal surfaces avoids the provision of ledges and the like upon which food spoil from the conveyor belt, and cleaning fluids, during cleaning, can collect. The surfaces of the conveyor frame will tend to shed, under gravity, food spoil and cleaning fluids to ground level.

Desirably the platform includes spaced parallel elongate channel shaped side beams arranged with their open faces mutually presented.

Conveniently a belt roller assembly is supported at each end of the platform.

Desirably said roller assemblies are slidably received within the channel sections of the side beams.

Preferably at least one of said belt roller assemblies includes extensible means whereby its roller can be moved towards as away from the opposite end roller to vary the tension in a belt entrained around the rollers.

Preferably the conveyor includes detachable cover members which fit over the ends of said side beams and the associated parts of the roller assemblies to shield these regions against ingress of foreign matter.

Preferably each leg structure includes a first component integral with one of said side beams and a second component fixed in use to said other of said side beams by way of a retainer.

Conveniently the or each leg component retainer is a moulded synthetic resin component.

Preferably each leg structure includes first and second ground engaging parts disposed respectively generally beneath said first and second side rails.

Preferably each ground engaging part carries a ground engaging foot at least one of which is vertically adjustable in use.

Conveniently said feet are moulded synthetic resin members and are engaged with the respective leg parts as a push fit.

BRIEF DESCRIPTION OF THE DRAWINGS

One example of the invention is illustrated in the accompanying drawings wherein:

FIG. 3 is a diagrammatic plan view of a metal blank, cut from a single sheet of metal, for bending to form the supporting frame of a belt conveyor;

FIG. 4 is a view similar to FIG. 3 showing, in broken lines, the principal bend lines along which the blank will be shaped to produce the frame;

FIGS. 6, 7 and 8 are top, front, and end elevational views of the frame of FIG. 5;

FIG. 9 is an enlarged cross-sectional view of a side beam of the frame;

FIGS. 10 and 11 are an end view and a cross-sectional view respectively of a first element of an adjustable foot, FIG. 11 being a sectional view on the line A-A of FIG. 10;

FIGS. 12 and 13 are end and side elevational views respectively of a second element of the adjustable foot;

FIG. 14 is a perspective view of a roller assembly for engagement with one end of the belt platform of the frame of FIG. 5;

FIG. 15 is a view similar to FIG. 14, but showing the components of the roller assembly as an exploded view;

FIG. 16 is a view of the roller cradle of FIGS. 14 and 15;

FIG. 22 is a partly exploded perspective view of a conveyor utilising the frame blank of FIG. 21; and FIGS. 23 and 24 are views similar to FIGS. 18 and 19 of a modified retainer for use in the conveyor of FIG. 22.

PREFERRED MODE OF CARRYING OUT THE INVENTION

The conveyors described herein with reference to the accompanying drawings are particularly, but not exclusively intended for use in the food industry. The conveyors may find use in conveying food industry raw materials, or partially or completely formed food products. However, it is to be understood that the conveyors may also find use in other environments not related to the food industry, particularly those environments where cleanliness and hygiene in relation to the conveyor is of importance.

Figure 1:
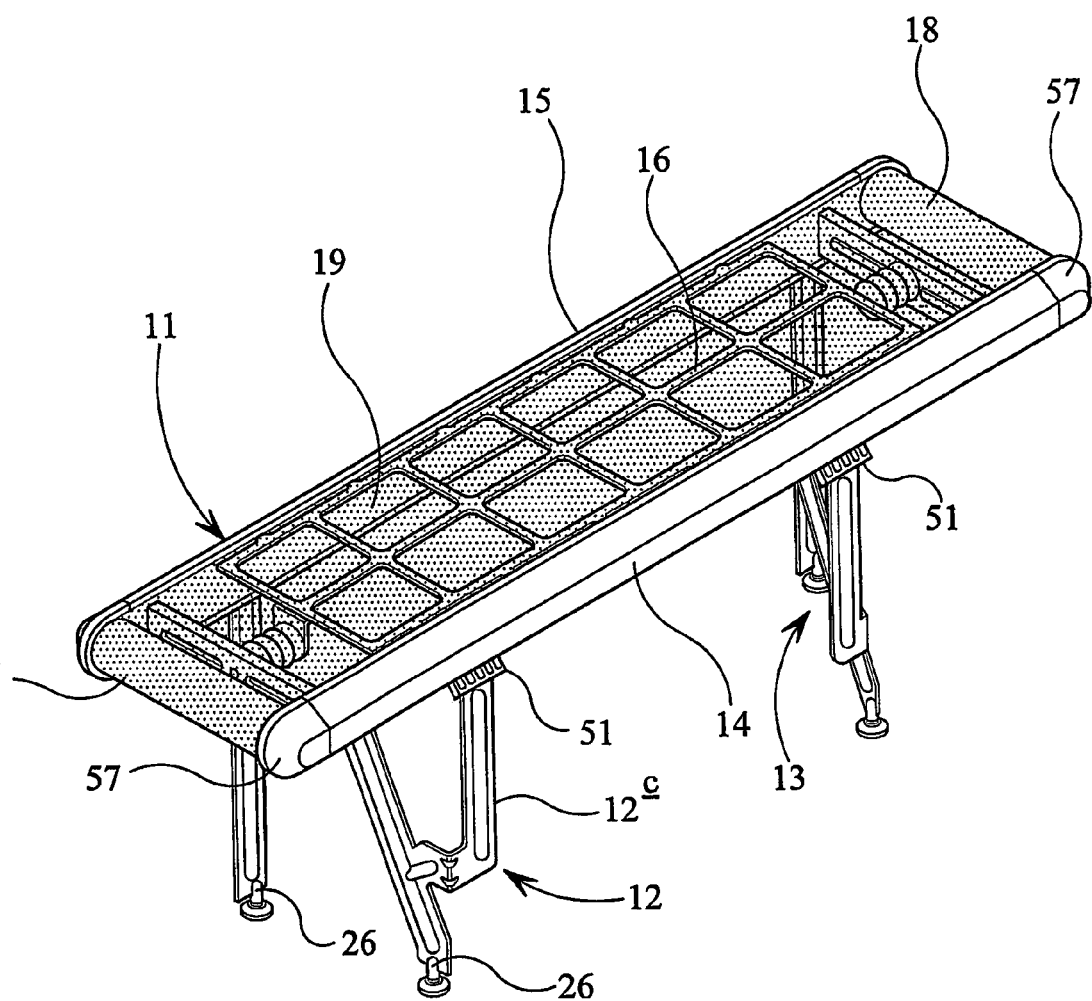
FIG. 1 is diagrammatic perspective view of an assembled conveyor.
Figure 2:
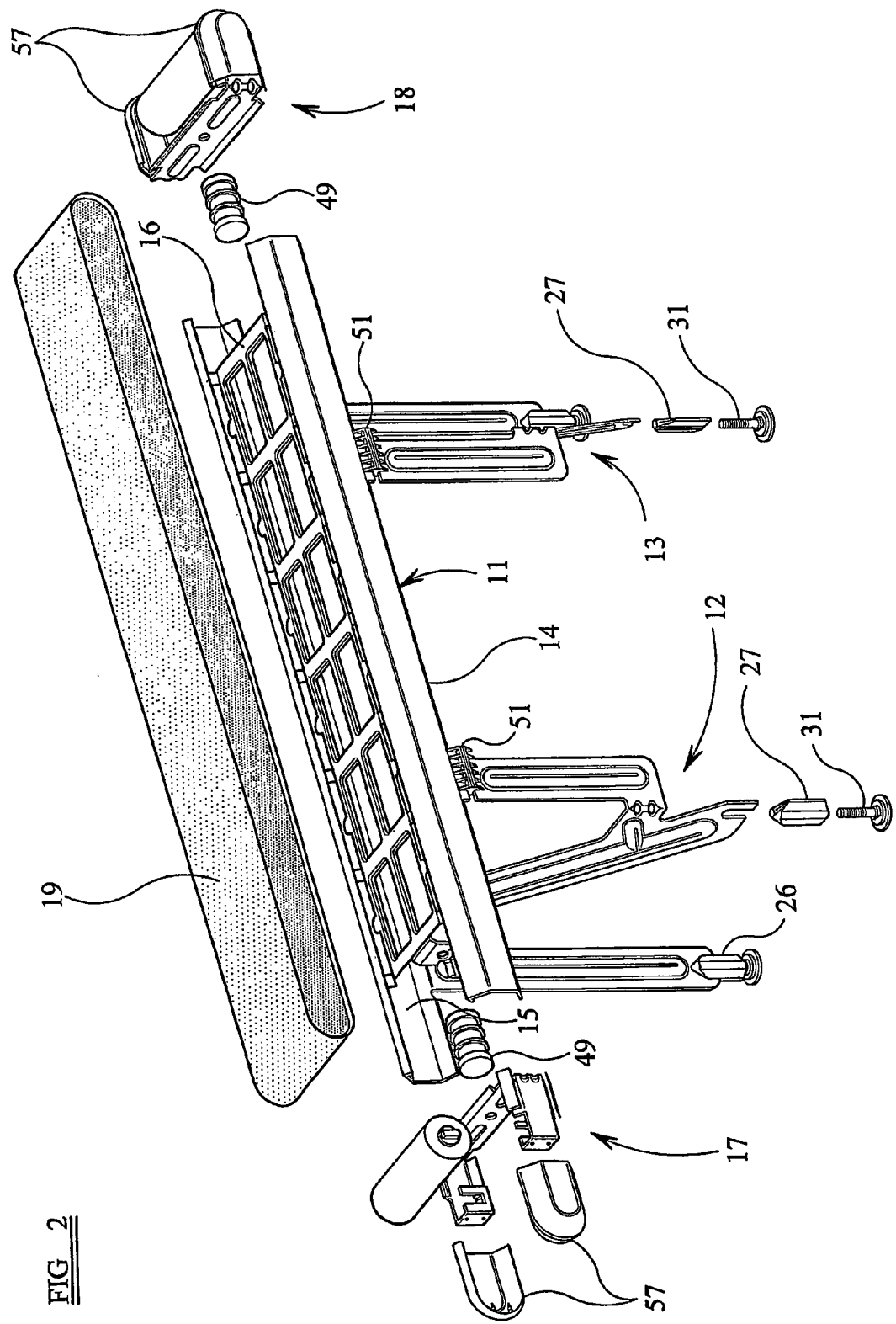
FIG. 2 is an exploded perspective view of the conveyor of FIG. 1.

It can be seen from FIGS. 1 and 2 that the conveyor comprises a metal support frame consisting of a belt platform 11 and a platform support arrangement including first and second leg structures 12, 13. The belt platform 11 includes first and second parallel side beams 14, 15 interconnected by a lattice structure 16. Roller assemblies 17, 18 are slidably received at opposite ends of the belt platform 11 respectively, and a conveyor belt 19 (shown as transparent in FIG. 1 to reveal the underlying structure) extends as a continuous loop around the roller assemblies 17, 18.

The conveyor frame is formed from "316 stainless steel" sheet, and in one particular embodiment the conveyor unit has a belt width of 280 mm, a conveyor length of 2,000 mm, and a frame height arranged so that the top run of the belt is 800 nm above floor level. The 316 stainless steel sheet from which the frame of the conveyor is formed is 2 mm in thickness.

A stainless steel sheet of appropriate thickness and dimensions is cut to form the blank illustrated in FIG. 3. The cutting operation could be achieved in a number of ways, including laser cutting, water jet cutting, and mechanical punching. Currently laser cutting is a preferred method for cutting the blank of FIG. 3 from the plain stainless steel sheet, but other methods should not be excluded.

Figure 5:
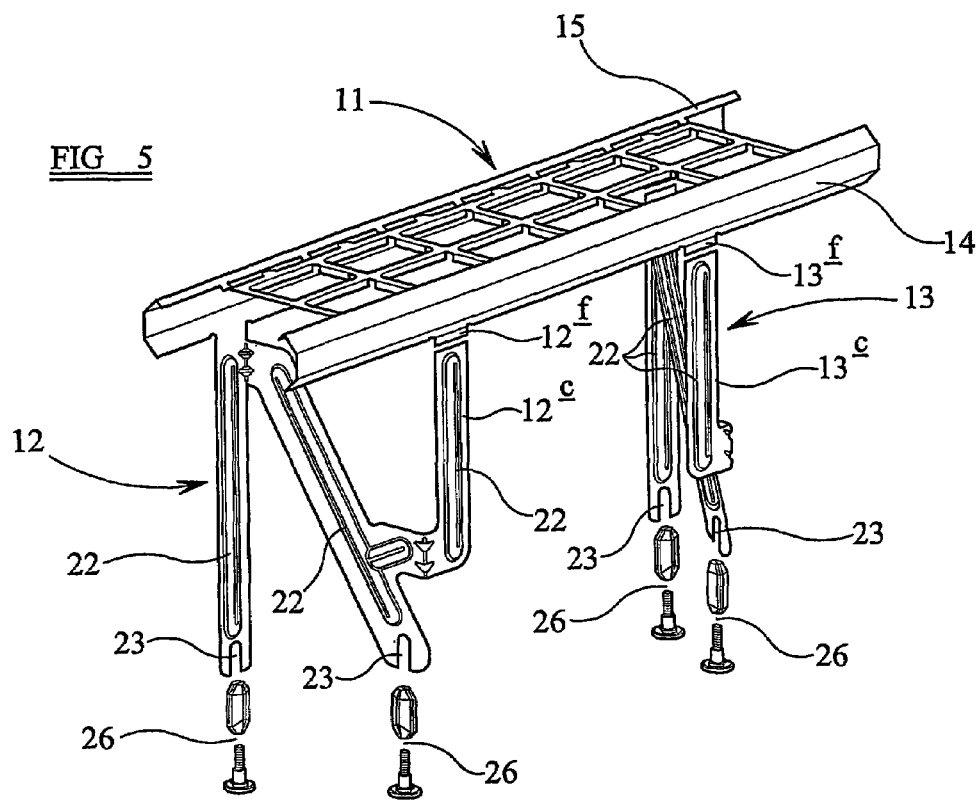
FIG. 5 is a diagrammatic perspective view of a unitary support frame of a belt conveyor, produced by bending and shaping the blank of FIGS. 3 and 4.
Figure 6:
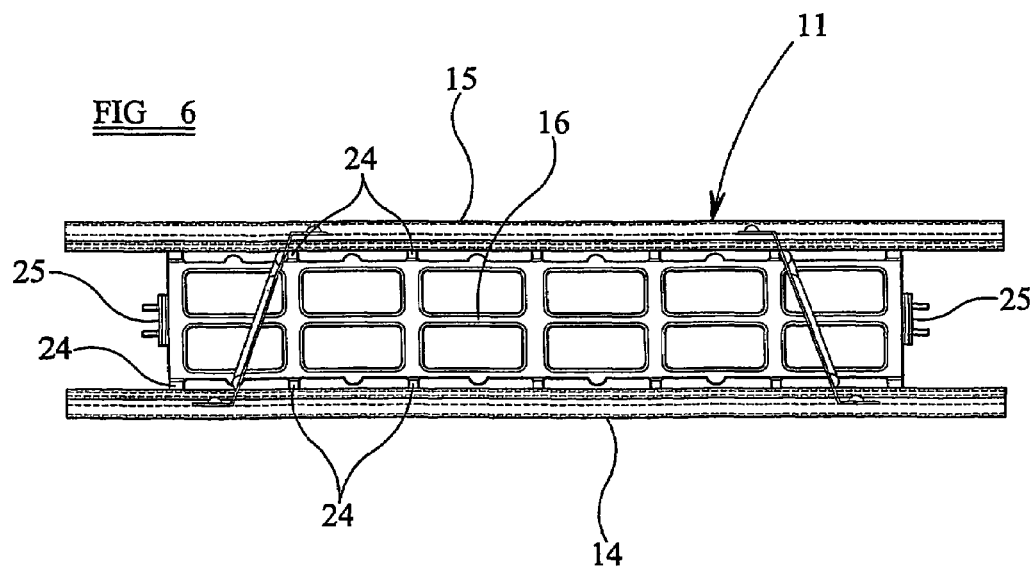

A plurality of broken lines have been added to FIG. 3 to produce FIG. 4. The broken lines indicate the principal bending lines along which the blank of FIG. 3 is bent to produce the conveyor frame of FIG. 2. In addition to bending the blank along the bend lines illustrated in FIG. 4 various component regions of the blank are subjected to a pressing operation to produce strengthening ribs within components of the frame, for example within the leg components. It will be apparent to the skilled man that the sequence of bending, pressing, and stamping operations which convert the unitary plane blank of FIGS. 3 and 4 into the unitary three dimensional frame of FIGS. 1, 2 and 5 is not a fixed sequence, and could be varied to suit the apparatus available to the manufacturer. By way of example the first stage in the conversion of the blank to the frame could be to subject the leg components 12, 13 of the blank 21 to a pressing and stamping operation to produce strengthening ribs 22 in the limbs of the leg components and notches 23 in the free ends of the limbs of the leg components for receiving adjustable feet. In the same operation the lattice region 16a of the blank 21 could be press formed to bend the margins of the apertures of the lattice structure downwardly out of the plane of the blank and to round the tops of the interstices of the lattice so that the finished lattice structure 16 has interstices which are of inverted U-shaped cross-section conferring significant rigidity to the lattice structure 16, and ensuring that the upper surfaces of the lattice are substantially free of horizontal ledges which could form a resting point for food spoil, or cleaning fluids.

Next the blank could be transferred to a brake-forming press to bend the beam regions 14a, 15a of the blank to the cross-section illustrated in FIG. 9. As is apparent from FIG. 9 the longitudinally extending, parallel, edge beams 14, 15 of the belt platform have a generally C-shaped cross-section, the upper edge of which is joined to the lattice 16 at a plurality of points along the edge of each beam by integral connecting strips 24. Each beam 14, 15 has a vertical wall 14b, 15b, inclined walls 14c, 14d and 15c, 15d on opposite sides of the wall 14b, 15b, a rounded top edge 14e, 15e and an inclined top edge region 14f, 15f terminating in the spaced connecting strips 24.

Integral with the lattice structure 16, and at opposite axial ends thereof, are first and second abutments 25 the purpose of which will be described in more detail hereinafter. It is to be recognised however that during the formation of the belt platform of the frame, the abutments 25 are bent downwardly so as to be parallel to the downwardly extending edge regions of the apertures of the lattice structure 16.

It will be recognised that the leg structures 12, 13 which constitute the support arrangement for the belt platform consist of three principal limbs indicated by the suffix a, b, c respectively, and which are integrally interconnected by integral joining elements indicated by the suffixes d and e respectively. The limbs 12a, 13a extend downwardly, co-planar with one another, from the lower edge of the wall 15d of the beam 15 of the belt platform. The joining portions 12d, 13d are bent through an angle of approximately 80° so that the inclined limbs 12b, 13b extend both transverse to the width of the belt platform and longitudinally towards the mid-point of the length of the belt platform. The joining portions 12e, 13e are then bent through the same angle as the portions 12d, 13d but in the opposite direction so that the limbs 12c, 13c lie co-planar with one another and parallel to but spaced from the plane of the limbs 12a, 13a. The limbs 12c, 13c are positioned beneath the lower edge of the wall 14d of the beam 14 of the belt platform, and are aligned with downwardly extending tags 12f, 13f integral with the lower edge of the beam wall 14d. It will be recognised that this sequence of bending steps converts the planar unitary blank of FIGS. 3 and 4 into the three dimensional unitary conveyor support frame of FIGS. 1, 2 and 5. The corners defined in the joining portions 12d, 13d and 12e, 13e can, as shown in FIG. 5, be indented to strengthen the corners.

It will be recognised that the lower free edges of the limbs 12a, 12b, 13a, 13b lie in a common plane parallel to the plane of the belt platform 11 of the conveyor frame. The lower free edges of the limbs could be the floor engaging parts of the frame, but in order to accommodate the positioning of the conveyor on a non-planar floor the slots 23 at the free ends of the limbs 12a 12b, 13a, 13b are fitted with adjustable foot units 26. Each adjustable foot unit 26 comprises a first moulded synthetic resin body component 27 (FIGS. 10 and 11) having a central, screw threaded bore 28 and a pair of diametrically opposed longitudinally extending grooves 29 for receiving the edges of the slots 23 in the limbs 12a, 12b, 13a, 13b when the bodies 27 are introduced into the slots 23. The ends of the bodies 27 which are uppermost in use are closed, and are of externally domed configuration so as to avoid providing ledges upon which food spoil and cleaning fluids can collect. The screw threaded bore 28 of each body 27 is presented downwardly, and receives a second component 31 (FIGS. 12 and 13) of the adjustable foot. The second component 31 has a screw threaded shank 32 at one axial end and a floor engaging pad 33 at its opposite axial end. Intermediate the pad 33 and the shank 32 the component 31 includes a non-circular boss 34. The shank 32 is received in screw threaded engagement in the bore 28 of a respective body 27 and the pad 33 engages the floor. A tool can be engaged with the boss 34 to rotate the component 31 relative to the body 27 to adjust the spacing of the body 27 and thus its respective leg from the floor. The upper surface of the foot pad 33 is domed again to avoid providing any surface upon which food spoil or cleaning fluid could collect. The boss 34 lies wholly beneath the lower end of the body 27 and so again does not provide a ledge for the collection of food spoil. The body 27 and component 31 are moulded in a synthetic resin material which has bactericidal properties thereby eliminating the possibility of bacterial growth on the components of each adjustable foot.

As mentioned previously a roller assembly is disposed at each end of the belt platform 11. FIGS. 14, 15 and 16 depict one of the roller assemblies 17, it being understood that the roller assembly 18 is generally identical. Each roller assembly includes a roller unit 35 consisting of a roller 36 the axial length of which is substantially equal to the width of the conveyor belt to be accommodated in use. The roller 36 is mounted on a shaft 37 the ends of which are non-circular and protrude from the axial ends of the roller 36. Additionally, each roller assembly includes a roller carrier or cradle 38 receiving the respective roller unit 35. Each carrier 38 is formed from a single sheet of "316 stainless steel" and is of generally rectangular U-shaped form comprising a base wall 39 and first and second parallel side walls 41 extending at right angles to the base wall 39 and extending from opposite ends of the base wall 39. As is apparent from FIG. 16 the base wall 39 can be pressed with ribs 42 and can be provided with integral inclined longitudinally extending flanges 43 which enhance the rigidity of the base wall 39. The corners defined between the base wall 39 and the side walls 41 can be strengthened with indents 44 as shown in FIGS. 15 and 16. The length of the base wall 39 is such that the spacing between the outer faces of the side walls 41 is slightly less than the spacing between the inner faces of the vertical walls 14b, 15b of the edge beams 14, 15 of the belt platform. Furthermore, each side wall 41 is formed with integral upper and lower inclined flanges 45 the angle of inclination of which are substantially equal to the angle of inclination of the inclined upper and lower walls 14c, 14d, 15c, 15d of the beams 14, 15. Each carrier 38 can thus be slidably received in a respective end of the belt platform with the side walls 41 thereof co-operating with the interior faces of the edge beams 14, 15. Bearing strips 46 moulded from a low-friction bactericidal plastic material are bonded to the outer faces of the flanges 45 of the walls 41 to facilitate sliding movement of each roller assembly within the respective end of the belt platform.

At their ends remote from the base wall 39, each of the side walls 41 is bent inwardly to define a flange parallel to the base wall 39, and the flanges so formed are then bent again at right angles to define flanges 47 extending parallel to the respective side walls 41, but spaced inwardly from the side walls 41 and extending rearwardly towards the base wall 39. Each of the flanges 47 is formed with a U-shaped slot 48 extending downwardly from the upper free edge of the flange 47, the width of each slot 48 being equal to the width of the non-circular region of the shaft 37 of the roller unit 35. The ends of the shaft 37 are non-rotatably received in the slots 48 so that the carrier 38 supports a respective roller unit 35. The roller 36 of each roller unit 35 can rotate about the shaft 37 relative to the carrier 38.

One or both of the roller units 35 can, if desired, incorporate known electric drive means, and/or electric brake means whereby the roller 36 of the unit can be driven and braked to drive or brake the belt 19 in use.

Each roller assembly 17, 18 is introduced as a sliding fit in the respective end region of the belt platform and a resilient bellows arrangement 49 is interposed between the rear face of the respective base wall 39 and the abutment 25 which depends from the lattice structure 16 of the belt platform.

The belt 19 of the conveyor unit is an endless strip of flexible material, conveniently a nylon or polypropylene moulding. In the assembled conveyor unit the belt 19 extends around the roller units 35 of the roller assemblies 17, 18, and a top run of the belt 19 extends between the roller assemblies overlying the lattice structure 16 and having at its marginal edges downwardly (so far as the top run is concerned) extending continuous beads co-operating with the inwardly and downwardly turned edge region 14f, 15f of the edge beams 14, 15 so as to minimise the risk of food spoil falling between the edge of the belt and the respective beam. The imperforate nature of the belt 19 and its edge co-operation with the beams 14, 15 minimises the risk of food spoil reaching the lattice structure 16 of the frame. The lower run of the belt extends between the roller units 35 beneath the lattice structure 16 and the abutments 25, but passing above the limbs 12b, 13b of the leg arrangements.

The assembly of the belt 19 to the frame is as follows. After introduction of the roller assemblies 17, 18 into opposite ends of the belt platform, the resilient bellows units 49 are collapsed or compressed in any convenient manner to allow the assemblies 17, 18 to be moved as close as possible to one another, thus minimising the spacing between the roller units 35. The minimum spacing which can be achieved between the roller units 35 is a dimension which is slightly less than the length of the belt 19, and so the belt 19 can be offered, in a lateral direction, to the assembly of the platform 11 and roller assemblies 17, 18 passing over the beam 14 and seating, at its ends, on the roller units 35 with the upper run of the belt 19 received between the inwardly inclined edges 14f, 15f of the edge beams 14, 15. The lower run of the belt 19 can pass between the upper edge of each limb 12c, 13c and the lower edge of the aligned tag 12f, 13f during assembly but immediately the belt is in place retainers 51 are engaged with the free ends of the limbs 12c, 13c and the corresponding tags 12f, 13f to link the limbs 12c, 13c to the beam 14. Thereafter the bellows units 49 are released, or expanded, to resiliently urge the roller assemblies 17, 18 outwardly, away from one another thereby tensioning the belt 19 between the roller assemblies. In the event that one or both roller assemblies has an electrical drive and/or braking unit then appropriate power connections can be made to the or each roller unit at this time.

In a modification only one of the roller assemblies 17, 18 is resiliently mounted, and the base walls 39 of the carrier 38 of the other roller assembly simply seats against the abutment 25 and belt tensioning takes place by resiliently biasing the other roller assembly outwardly.

Figure 17:
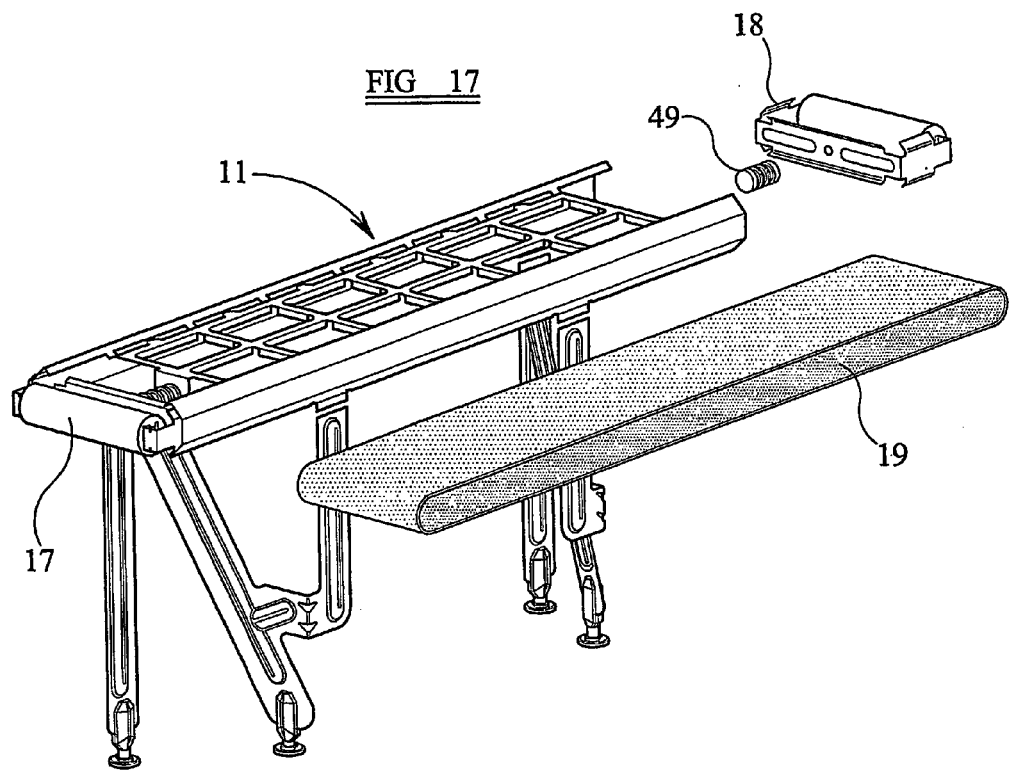
FIG. 17 illustrates the positioning of the roller assemblies at opposite ends of the belt platform and the engagement of the belt with the roller assemblies.
Figure 18:
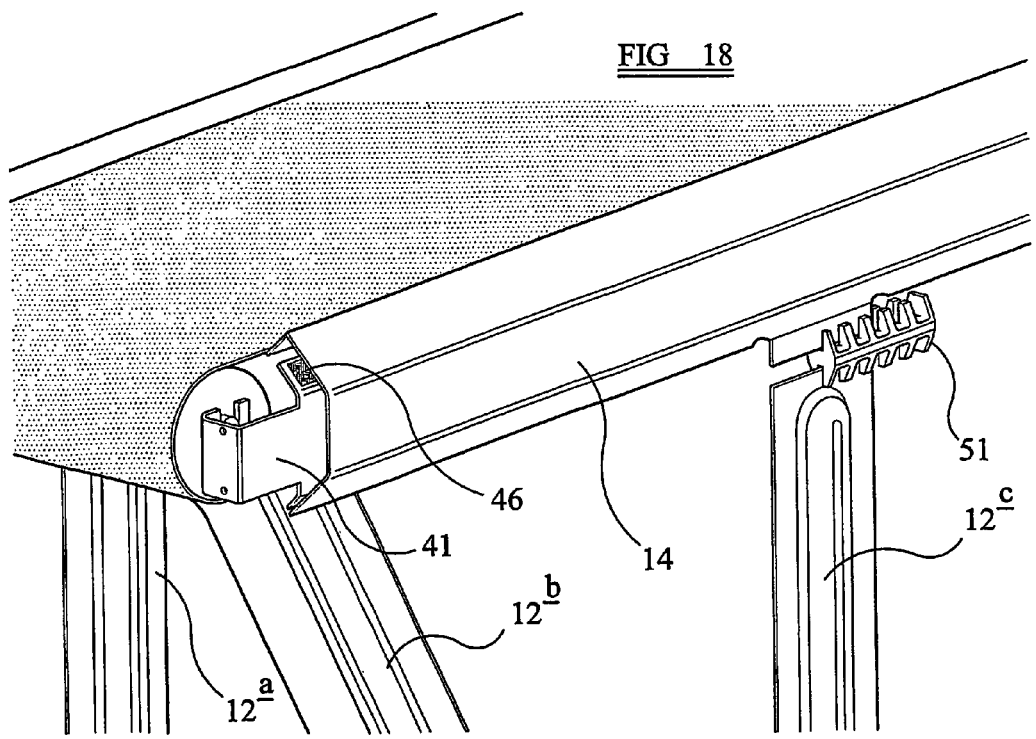
FIG. 18 is an enlarged diagrammatic representation of part of the conveyor frame illustrating the assembly thereto of leg retaining members.
Figure 19:
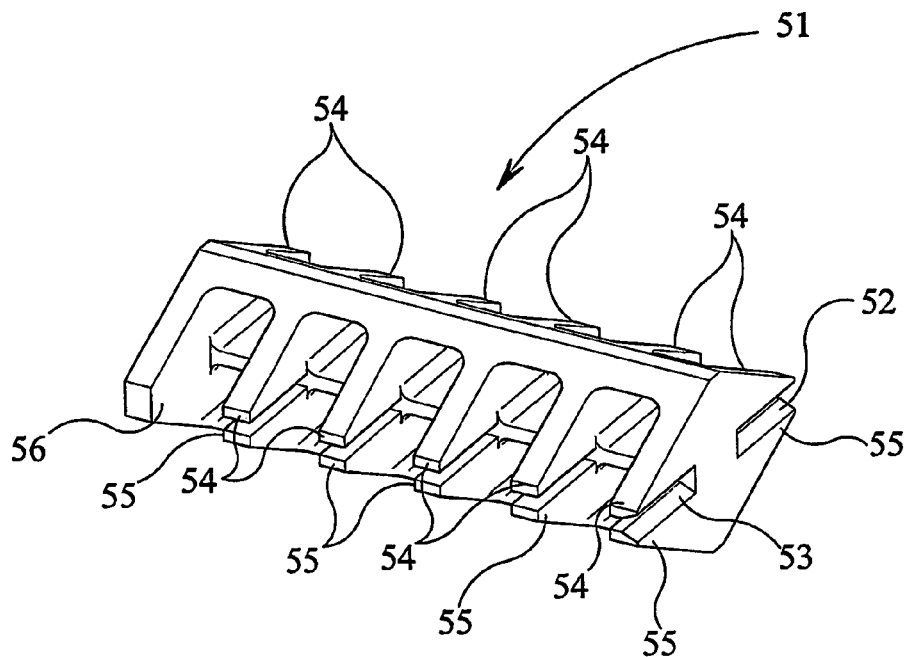
FIGS. 19 and 20 are perspective views of alternative leg retaining members.
Figure 20:
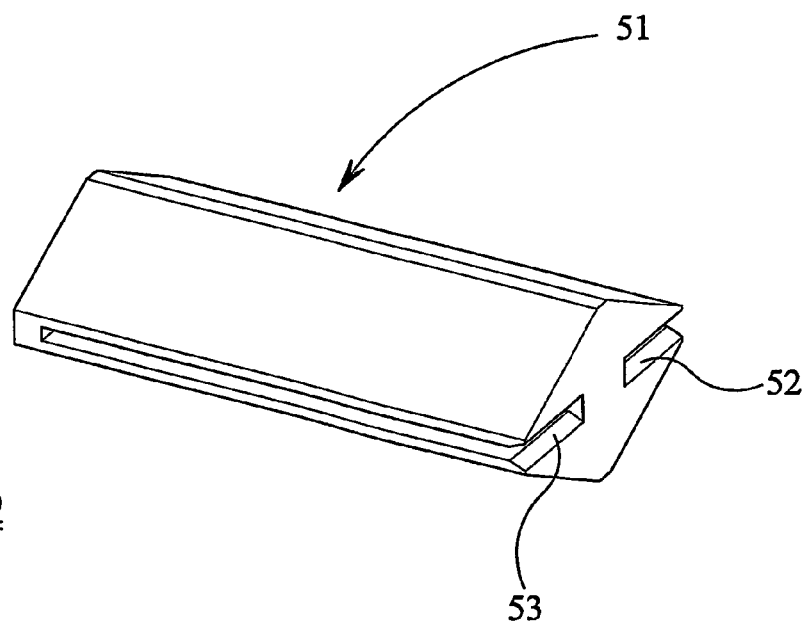

As is mentioned above, after fitting of the belt 19 between the roller assemblies 17, 18 each limb 12c, 13c of the respective leg arrangement is coupled to its respective tag 12f, 13f of the belt platform beam 14 by means of a retainer 51. The process is illustrated in FIGS. 17 and 18, and the retainer 51 is shown in more detail in FIG. 19. The retainers 51 of the limbs 12c and 13c are identical, and each is a moulding of a bactericidal synthetic resin material. Each of the retainers 51 is of diamond shaped cross-section and has first and second aligned slots 52, 53 extending towards the mid-line of the moulding from opposite apical edges thereof. Although the slots 52, 53 extend towards one another, they terminate short of the mid-line of the retainer 51 so that the retainer 51 has a core equal in thickness to the width of the slot between the free end of a limb 12c, 13c and the free edge of the corresponding tag 12f, 13f. Furthermore, if desired in order to save material each retainer 51 could be moulded "cut away" at a number of points along its length so as to define a plurality of pairs of fingers 54, 55 spaced apart by the slots 52, 53 and equidistantly spaced along the length of the retainer. The slots 52, 53 would not extend through the full length of the retainer 51, so that there would be an unslotted region 56 at one axial end of the retainer to act as an abutment defining the fully inserted position of the retainer when the retainer is slid into place in the gap between the respective limb 12c, 13c and its associated tag 12f, 13f. However in most applications the "cut away" of the retainer 51 will be avoided so that the retainer is of diamond-shaped cross-section throughout its length presenting planar, unbroken, inclined surfaces upwardly in use as shown in FIG. 20.

As is apparent from FIGS. 17 and 18 each retainer 51 is slid laterally into the gap so that the tag 12f, 13f seats in the slot 52 while the upper free edge of the limb 12c, 13c seats in the slot 53. The portions of the retainer 51 which make facial engagement with the opposite faces respectively of the limbs 12c, 13c and tags 12f, 13f resist lateral displacement of the limbs 12c, 13c relative to the tags 12f, 13f, and the central core of each retainer 51 transmits vertical load from the beam 14 of the belt platform into the leg arrangements 12, 13.

Appropriate shaped, moulded, snap-on covers 57 are provided at the ends of the beams 14, 15 of the belt platform to cover the protruding parts of the carriers 38 of the roller assemblies 17, 18. The covers are provided for aesthetic, safety, and hygiene reasons. The covers are moulded in a bactericidal plastic material, and snap engage with the flanges at the ends of the side walls 41 of the carriers 39. The covers 57 abut the end faces of the beams 14, 15 and overlie the protruding parts of the carriers 39 thereby minimising the risk of operatives trapping clothing or body parts in the roller assemblies. Moreover, the shaping of the covers avoids the presence of horizontal surfaces so minimising the risk of food spoil and/or washing fluids adhering thereto.

FIGS. 21 to 24 illustrate a modification to the conveyor described above, the primary distinction being that the platform support arrangement is more robust than that described in relation to FIGS. 1 to 20. Where appropriate the reference numerals used in FIGS. 1 to 20 are also used in FIGS. 21 to 24 to denote the same or functionally similar components.

Figure 21:
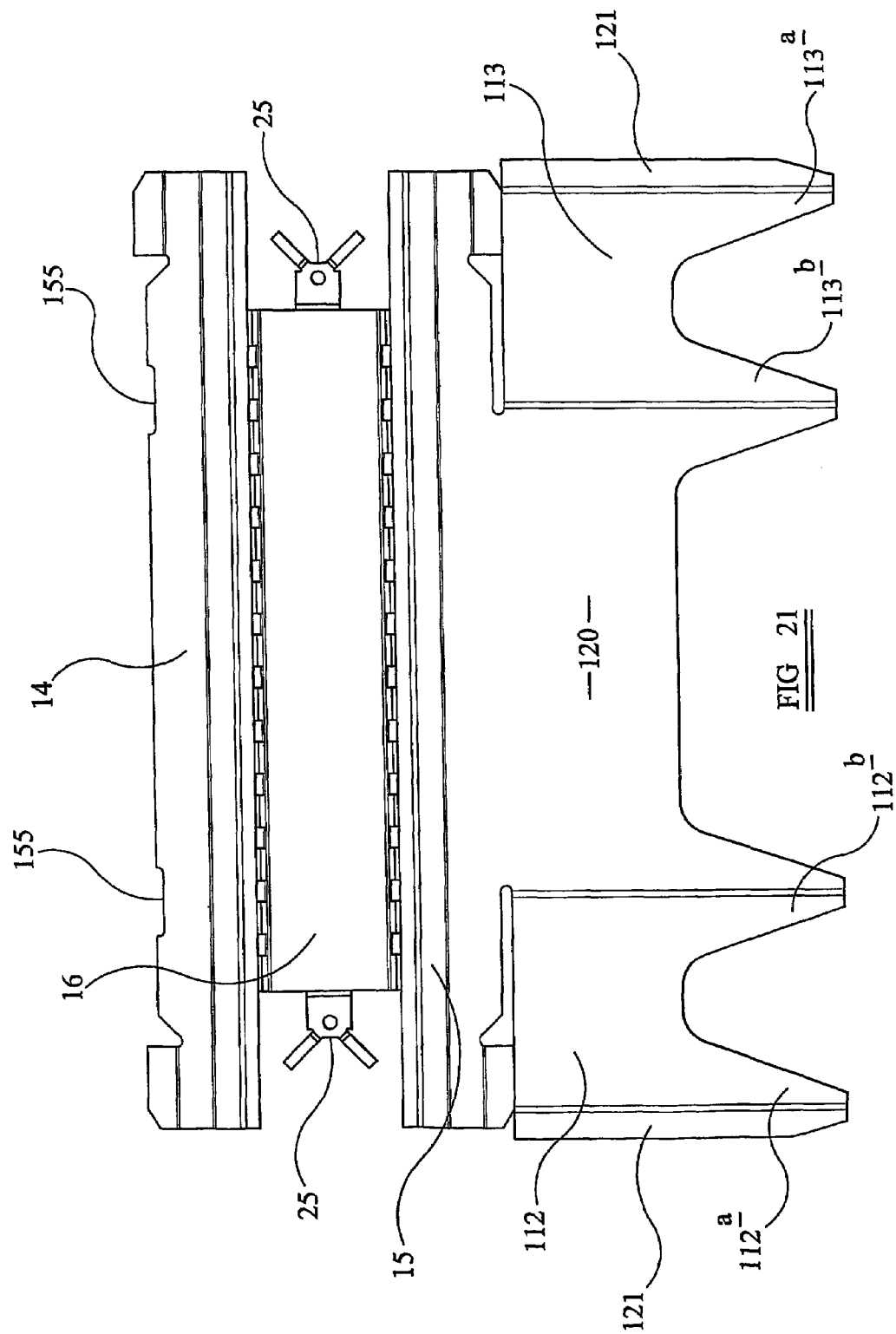
FIG. 21 is a view similar to FIG. 3 of an alternative frame design.

A comparison of FIGS. 21 and 22 with FIGS. 3 and 2 of the embodiment described above reveals that the belt platform structure is very similar to that described above, but that whereas in FIGS. 1 to 20 the leg structures each consist of generally three elongate components, in the arrangement of FIGS. 21 to 24 the leg structures are more in the form of rigid sheet-like components, and the rear side beam 15 of the platform structure, with which the support structure is integral, includes a continuous web extending at right angles to the plane of the platform and interconnecting the two opposite support leg structures, more specifically it can be seen that the support leg assembly 112, 113, 120 is integral with the belt platform structure by way of the planar web 120 which extends integral with the side beam 15 of the platform throughout a substantial proportion of the length of the beam 15. At its opposite longitudinal ends the web 120 is integral with first and second sections which are bent are right angles to the plane of the web to extend beneath the platform and to terminate beneath the side beam 14 of the platform. The two right angle sections 112, 113 are generally planar, and at their front edges are bent through 90° to define coplanar, vertically extending flanges 121 extending towards one another beneath the beam 14. The web 120 and the right angle sections 112, 113 have tapering cut-outs such that the web 120, the side sections 112, 113, and the flanges 121 which are parallel with the web 120 define between them four downwardly extending legs 112a, 112b, 113a, 113b disposed generally beneath the beams 14, 15 of the platform. Each of the legs comprises two planar portions at right angles to one another, and at their free, lowermost, ends the legs are push fitted into adjustable moulded feet 26 similar to those described above.

In order to secure the leg structures to the beam 114 moulded synthetic retainers 151 are provided. The retainers 151 include rearwardly extending slotted limbs 152 which receive the upper edges of the sections 112, 113 beneath the platform, a notch 153 which receives the respective flange 121 and a slotted top region 154 which seats within a notch 155 provided in the beam 14 and receives therein the sheet material of the beam 14 around the notch 155. Thus the retainers 151 secure the front regions of the leg structures to the beam 14, and transmit the weight of the platform, and any material conveyed by the belt 19, to the leg structures.

It will be recognised that the conveyor units constructed as described above have their supporting frame formed from a single sheet of stainless steel, the only exception to this being the provision of the retainers 51, 151 which are necessary to the structural integrity of the frame, and, in the examples described, the adjustable feet 26 which are desirable in a practical embodiment. The use of a fabricated frame with the attendant problems of bolted or welded connections is thus avoided. Moreover, the shaping of the frame, and ancillary components thereto, is such as to minimise, and in this particular embodiment avoid completely, the presence of horizontal surfaces upon which food spoil and washing fluids can collect. The shaping of the frame promotes self cleaning and draining under gravity.

It will further be recognised that the assembly of the conveyor unit utilising the unitary frame is extremely simple, and can therefore be performed rapidly with a minimum of manual effort. In order to "strip-down" the conveyor for cleaning or maintenance the or each bellows unit 49 is collapsed to remove tension in the belt 19, the retainers 51, 151 are withdrawn, and the belt 19 can then be withdrawn forwardly over the beam 14, the lower run of the belt passing between the upper edges of the leg structures and the beam 14. Thereafter the roller assemblies 17, 18 can simply be withdrawn, and if necessary upon removal of the covers 57 the roller units 35 can be lifted out of their carriers 38. The frame and the other components can then be steam or spray cleaned, and again by virtue of the shaping of the frame it will be virtually self draining. Reassembly of the conveyor is equally simple.

It will be recognised that it is extremely desirable for the belt platform and the platform support arrangements to be integral with one another. However, complications in the formation of the three dimensional frame from the two dimensional blank may, in some applications, dictate that the belt platform should be formed from a separate blank to that from which the platform support arrangement leg structures is formed. It will be noted therefore that it is within the scope of this invention to provide means for attaching the whole of the leg structure of platform support arrangement to the belt platform, the undesirable nature of a connection between parts of the frame being outweighed by the advantage to be gained in manufacturing technique. It will be accepted however that where practical it is desirable for the belt platform and the platform support arrangement to be integral parts of a unitary construction.

The invention claimed is:

1. A method of constructing a conveyor, the method comprising:
   forming a belt platform as a unitary component from a single sheet of metal;
   forming a platform support arrangement as a unitary component from a single sheet of metal;
   supporting said belt platform on said platform support arrangement, wherein said platform support arrangement is formed by bending to provide integral leg structures that extend underneath the belt platform; and
   securing the belt platform support arrangement by means of a retainer without welding or using threaded fasteners providing a conveyor belt.

2. A method as claimed in claim 1, wherein the belt platform and the platform support arrangement are formed as an integral unit from a single sheet of metal.

3. A method as claimed in claim 1, wherein the surfaces of the belt platform and of the platform support arrangement are formed to have a shape so that in use substantially all of the exposed surfaces are non-horizontal to promote self cleaning and draining.

* * * * *